United States Patent [19]

Hopkins

[11] 4,059,336
[45] Nov. 22, 1977

[54] MICROSCOPE AND MAGNIFICATION CHANGER

[76] Inventor: Harold Horace Hopkins, 26 Cintra Ave., Reading, Berkshire, England

[21] Appl. No.: 549,981

[22] Filed: Feb. 14, 1975

[30] Foreign Application Priority Data

Feb. 14, 1974 United Kingdom ................ 6762/74

[51] Int. Cl.$^2$ ...................... G02B 21/20; G02B 17/08
[52] U.S. Cl. ........................................ 350/55; 350/36
[58] Field of Search .................... 350/55, 54, 35–39, 350/27, 48, 50, 199, 294, 252

[56] References Cited

U.S. PATENT DOCUMENTS

| | | | |
|---|---|---|---|
| 1,544,118 | 6/1925 | Yancey | 350/55 |
| 2,413,286 | 12/1946 | Buchele | 350/36 |
| 2,638,814 | 5/1953 | Keuffel et al. | 350/27 |
| 2,664,026 | 12/1953 | Kavanaugh | 350/199 |
| 2,901,942 | 9/1959 | Tackaberry | 350/36 |
| 2,901,943 | 9/1959 | Tackaberry | 350/36 |
| 3,704,932 | 12/1972 | Schick | 350/35 |

FOREIGN PATENT DOCUMENTS 14,426 4/1971 Japan ...................... 350/54

Primary Examiner—Jon W. Henry
Attorney, Agent, or Firm—Ostrolenk, Faber, Gerb & Soffen

[57] ABSTRACT

This invention relates to a stereo microscope comprising light collection means for collecting two angularly separated beams of rays from an object, a light path for each beam to guide said beam from said light collection means to an eye-piece and magnification means associated with each light path, whereby on viewing simultaneously the beam leaving each light path, a magnified stereoscopic image of the object is obtained, characterized in that the light collection means for each path comprises a first reflecting surface, and a second reflecting surface in spaced relationship with a first reflecting surface, in which each first surface is adapted to receive and reflect a beam from an object to said second reflecting surface, the beams reflected from the second reflecting surface being disposed along substantially spaced parallel axes.

9 Claims, 2 Drawing Figures

MICROSCOPE AND MAGNIFICATION CHANGER

The present invention relates to stereo microscopes and has particular reference to a microscope capable of producing an enhanced stereoscopic effect.

At the present time there are two types of stereoscopic microscope widely employed in industry. The first of these is generally known as the "Greenhough" stereoscopic microscope, which comprises a pair of objectives disposed with their optical axes inclined at an angle one with respect to the other to provide inclined object planes at a given point on the object and magnification means arranged to provide magnification of the object, the light path through the magnification means including a pair of porro prisms to enable relative movement of the binocular eyepieces to adjust the viewing distance and also to give a finally erect image.

The disadvantage of this general arrangement is that the light paths through the instrument are inclined at an angle with respect to one another with the result that the insertion of a zoom device or a magnification changer into each light path gives rise to the difficulty that these devices have to operate on inclined optical axes. Secondly, if the central diameter is accurately focused for both light paths, there will be a progressive focus error for points in the object between this diameter and the edge of the field of view. Moreover, since the mean plane of the object in respect to the optical axes is different, the wider the angle of inclination of the optical axes of each light path, the greater is the focus error between the outer parts of the two observed images.

The limiting factor of the stereoscopic effect is, of course, the size of the angle between the optical axes of each component of the binocular microscope system. The greater this angle, then the greater is the stereoscopic effect. This effect is limited in practice, since the greater the angle of inclination between the optical axes, the greater is the departure from perpendicularity between the mean plane of the object and these axes, and the greater is the focus error for the outer parts of the object.

It will be appreciated that a principal use of the stereoscopic microscope is as a dissecting microscope or in its use in the manufacture of microelectronics. For instance, in each case it will be appreciated that the clearance between the objective on the one hand and the object on the other should be as great as possible. With the "Greenhough" microscope this is usually less than 20 mm for the higher magnification, and, in consequence, considerable limitations are imposed on the use of "Greenhough" microscopes in such manufacturing techniques.

In an attempt to overcome this, the so-called 'parallel-axis' microscope was developed. This microscope comprises a large single objective lens with the object placed at the first focal plane of the objective. A pair of light beams defining a suitable stereo angle between them is then to be projected substantially parallel to the optical axis of the large objective lens and a further series of separate magnification systems can be applied separately to the light beams passing through the objective lens to provide the binocular stereoscopic effect. This has the advantage that the optical axes of each of the magnification systems and in consequence the associated light paths are substantially parallel and it makes it very much easier to insert zoom lens components or magnification changers in such a binocular system.

The principal disadvantage of the parallel axis microscope is, however, that when using white light or light of a non-primary colour, then a secondary spectrum is obtained in the viewed image and this produces colour fringes even for the axial parts of the image, and this is a nuisance in some of the uses to which a binocular microscope can be employed. The parallel axes system does, however, have the advantage that the viewing lens or the beam collection means for the binocular system can be disposed at an increased distance typically between about 30 and 50 mm from the object, thus permitting an increase in working clearance above the object. The system has the further advantage that the whole of the mean plane of the object is generally in focus, but the colour fringing is more severe as the angle between the viewing axes is increased and this limits the useful degree of stereoscopy that may be obtained.

According to the present invention, there is provided a stereo microscope comprising light collection means for collecting two angularly separated beams of rays from the object, a light path for each beam to guide said beam from said light collection means to an eyepiece and magnification means associated with each light path whereby on viewing simultaneously the beams leaving the light paths, a magnified stereoscopic image of the object is obtained, characterised in that the light collection means for each piece comprises a first reflecting surface and a second reflecting surface in spaced relationship with a first surface in which each first surface receives and reflects a beam from an object to said second reflecting surface, the arrangement being such that the beams reflected from the second reflecting surface are disposed along substantially spaced parallel axes.

By employing reflecting means such as mirrors, the problem of the colour fringing which is normally associated with the traditional parallel axes system is overcome.

The first reflecting surface is concave and the second reflecting surface is convex and the first and second surfaces are preferably concentric. In any case, it is preferred that the axial separation of their centres of curvature does not exceed one tenth of the longer of the two radii of curvature. The second surface associated with each light path may be substantially continuous, the first reflecting surface may comprise a single concave mirror. The object may be viewed by means of a pair of spaced apertures, light passing from the objects to the apertures may be reflected from the first surface onto the second surface and then along a pair of spaced parallel axes to separate magnification means for each light path. Each light path may comprise an objective and an eyepiece and, if desired, the optical axis of the eyepiece may be inclined at an angle to the optical axis of the light path by means of intermediate prisms. The separation of the eyepieces may be effected by means of a rhomboid prism, since in the preferred form two intermediate images are formed along each path, so that the final images are erect and it is then not necessary to employ Porro prisms for the erection of the final images. Intermediate the objective and the prism in each light path, a number of intermediate lenses may be provided; the intermediate portion of each light path may also include a magnification changer.

The magnification changer may comprise a simple Galilean telescope capable of rotation to provide a converging lens nearest the objective, a diverging lens nearest the objective, or to an intermediate position in which both of the lenses are out of the optical path.

The invention further includes a magnification changer for a stereo microscope comprising a converging lens, a diverging lens spaced along the optical axis therefrom, means for rotating the said lenses about a fixed point so that a converging light beam is initially incident upon either of the said lenses or passes directly through the changer without impinging upon either of the lenses, thereby permitting a change of magnification to be effected between the three positions. The fixed point of rotation of the converging and diverging lens may be coincident with the point of convergence of the incident light beams. The focal lengths and axial separation of the converging lens and the diverging lens may be so arranged that a virtual object positioned at the fixed point of rotation produces a virtual image also at this fixed point; the object to image distance for the combination of the converging lens and the diverging lens is thus zero, and the image point is coincident with the object point. The converging lens and the diverging lens may be accommodated within a housing separate from and movable with respect to the housing of the microscope per se. This improved form of magnification changer has light beam of much smaller diameters at the lenses than the conventional Galilean telescope magnification changer. The aberrations of each component are in consequence greatly reduced: moreover, since the two components have chromatic variations of magnification of opposite algebraic sign, good image quality may be obtained using two single lenses. By contrast, satisfactory image quality may only be obtained with a Galilean telescope system if each of the two components is made of at least two lens elements.

The invention further includes a magnification changer for a stereo microscope wherein a pair of changers in accordance with the invention are coupled to each other for association with each light path of the microscope whereby operation of the rotation means results in the simultaneous alteration of the magnification in each light path by rotation of the converging and diverging lenses about a fixed intermediate point.

The following is a description by way of example only and with reference to the accompanying drawing of a microscope in accordance with the present invention.

Figure 1:
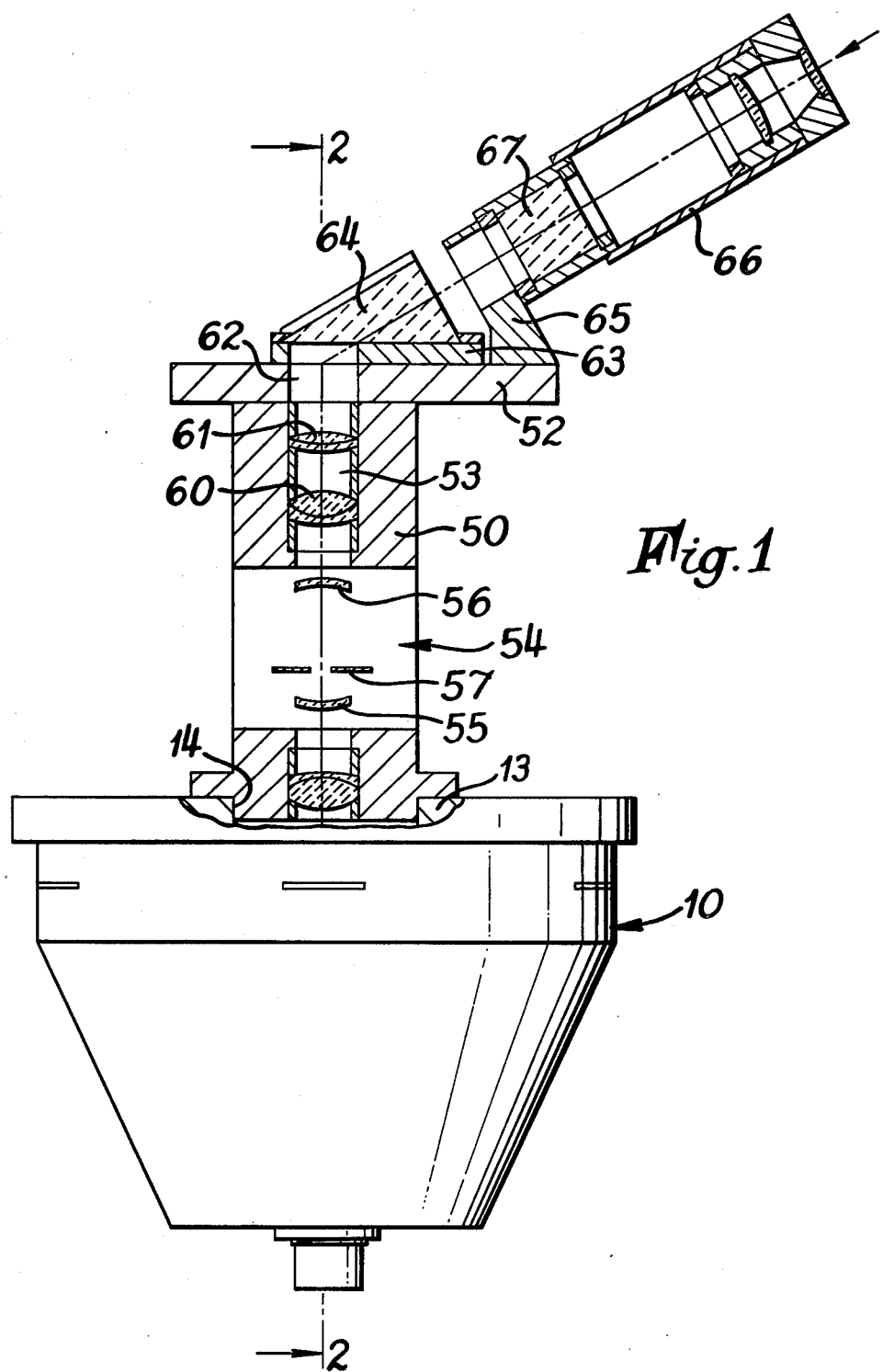
FIG. 1 is a view partially in section of a microscope in accordance with the invention.
Figure 2:
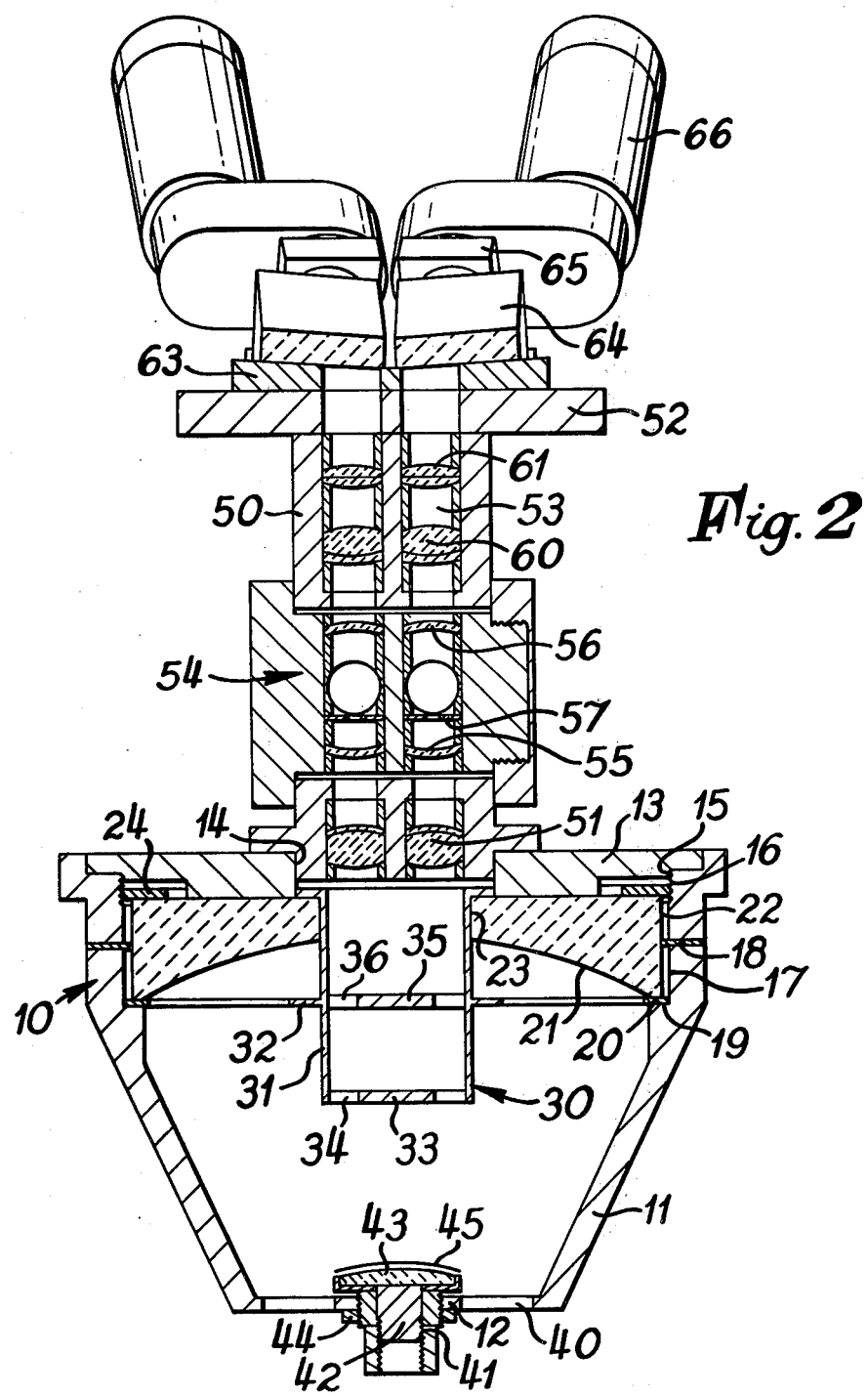
FIG. 2 is a section through the light collection means of the microscope of FIG. 1.

The lower portion of the microscope comprises a housing portion 10 having a generally converging dependent frusto-conical portion 11 terminating in a circular end 12. The upper portion of housing 10 is closed by a plate 13 having central opening 14 and threadably engaging housing 10 by means of threaded portion 15 engaging a cooperating threaded portion 16 on the internal surface of housing 10. The housing 10 is recessed on its internal surface at 17, the upper portion of which recessed portion 17 is threaded at 16. Additionally, the housing 10 carries a plurality of radially inwardly projecting guides 18 and a shoulder 19 of recessed portion 17 carries a minor support 20. The recessed portion 17 serves to locate and engage with a part-spherical concave mirror 21 having a downwardly directed reflecting surface. The outer circumference of the mirror 22 is located by means of guides 18, mirror 21 is supported by means of mirror supports 20. The mirror 21 has a central opening 23 and the mirror is clamped into place by annular clamping means 24, threadably engaging threaded portion 16 of recess 17 of housing 10.

The central aperture 14, top plate 13 and central opening 23 and mirror 21 serve to accommodate a light shield 30 comprising a substantially cylindrical sleeve 31 having a radial flange 32 extending outwardly of the cylindrical outer surface of sleeve 31, constituting a light baffle to define the aperture to each of the part mirrors 21 defined by light shield 30. The shield carries at its lower end a lower plate 33 having a pair of spaced circular apertures 34, each adapted to receive a light beam reflected by a mirror 21 and to define a light path therefor. An intermediate baffle 35 is provided internally of sleeve 31 and constitutes an internal plate having a pair of spaced apertures 36 directly corresponding and coaxial with apertures 34 in lower plate 33.

The bottom plate 12 of housing 10 has a pair of circular apertures 40 and has a central threaded bore 41. The bore 41 carries a threaded spigot 42 the upper end of which supports internally of housing 10 a convex mirror 43 adapted to be disposed substantially concentrically with mirror 21. A lock nut 44 is provided for spigot 42 to permit adjustment of mirror 43 with respect to mirror 21, thereby permitting precise adjustment of the spacing between the mirrors. The upper surface of mirror 43 includes an aperture stop 45 for controlling the brightness of the images produced.

In operation, light enters each of apertures 40 from the plane of the object, the optical axis of the light beam to the mirror 21 being inclined one with respect to the other. The light passing aperture 40 is reflected by mirror 21 and thence to mirror 43. After reflection at mirror 43, light passes into light shield 30 by means of apertures 34 and 36 to define a pair of spaced parallel light beams entering the respective light paths for subsequent magnification by the microscope.

The microscope per se associated with each light path comprises a substantially erect body 50 having at its lower end an adjustably mounted objective 51, and carrying at its upper end a rotatable table 52. The microscope body 50 has a substantially cylindrical path defining part of a light path 53 and intermediate the objective 51 and the table 52 there is provided a magnification changer indicated generally at 54.

The magnification changer 54 comprises converging lens 55, diverging lens 56 and a baffle 57. The converging lens 55 and the diverging lens 56 are mounted in spaced parallel relationship one with the other and the pair of lenses are together rotatable about an axis passing through the focal point of the objective lens 51. The converging lens 55 and the diverging lens 56 and a through hole (not shown) are maintained in fixed spaced relationship one with the other and changer means is provided (not shown) to rotate the lenses on the through hole about said axis, the changer means acting simultaneously on the lenses in each of the light paths of the microscope. Further lenses 60 and 61 are provided upwardly of magnification chamber changer 54 and a table 52 having a central aperture 62 is mounted at the upper end of body 53 and carries on its upper surface thereof a prism angle plate 63 carrying a 30° prism 64 which serves to deviate the optical axis of the light path by an angle of substantially 60°. The table 52 carries eyepiece support 65 and associated magnification eyepiece 66. Intermediate eyepiece 66 and support 65 is provided a rhomboid prism 67 to permit relative rotation of the eyepiece about an offset axis to permit variation of the separation of each of the eyepieces of the binocular instrument.

I claim:

1. A stereo microscope for stereoscopically studying an object, comprising:

two separate light paths for two separate beams of light from the object; each said light path being defined by:

a respective first reflective surface positioned and directed so as to intercept a respective one of the two separate beams of light;

second reflecting surface means spaced from said first reflective surfaces; said second reflecting surface means being shaped and oriented to have the separated beams of light reflected to different locations on said second reflecting surface means by said first reflecting surfaces; said second reflected surface means also being shaped and oriented such that the two beams of light reflecting therefrom are disposed along substantially parallel axis;

a respective magnification means and eyepiece in each said light path and positioned to intercept and receive a respective beam of light reflected from said second reflecting surface means; and a portion of each light path including, in series, a means for converging light leaving said second reflective surface means, and a magnification changer positioned to receive light converged by said converging means, said magnification changer comprising a converging lens, a diverging lens spaced along the optical axis thereof, means for rotating said lenses about a fixed point so that a converging light beam is initially incident upon either of said lenses or passes directly through the changer without impinging upon said lenses, thereby permitting a change of magnification to be effected between the three positions.

2. A stereo microscope as claimed in claim 1 wherein said first reflecting surfaces and said second reflecting surface means are mirrors.

3. A microscope as claimed in claim 2 wherein each said first reflecting surface is concave and said second reflecting surface means is convex.

4. A microscope as claimed in claim 3 wherein said first surfaces and said second surface means are concentric.

5. A microscope as claimed in claim 3 wherein the axial separation of the centres of curvature of said first surfaces and said second surface means does not exceed one tenth of the longer of the two radii of curvature of each of said first surfaces and of said second surface means.

6. A microscope as claimed in claim 1 wherein said second surface means comprises a respective second surface section associated with each said light path; each said second surface section being continuous and said first reflecting surfaces being both defined on a single concave mirror.

7. A microscope as claimed in claim 1 wherein said converging means comprises an objective lens located to receive and transmit light from said second surface means toward said magnification changer; the fixed point of rotation of the converging and diverging lens being coincident with the focal point of the objective lens for the incident light beams.

8. A microscope as claimed in claim 1 further comprising a separable housing in which said converging lens and diverging lens are accommodated; said separable housing being separable from and movable with respect to said reflecting surfaces of said microscope.

9. A microscope as claimed in claim 1, further comprising a housing in which said first reflecting surfaces and said second reflecting surface means are located; said housing having a surface on the side thereof facing toward the object to be viewed with said microscope; said housing surface having two spaced apart light passage permitting openings therein through each of said one of two separate beams of light from the object passes, said openings defining the start of the respective said light paths; said first reflecting surfaces each being located in opposed spaced relationship to a respective one of said openings in said housing and each being so positioned as to receive the light from one said light entry permitting opening.

* * * * *